United States Patent [19]

Lewis

[11] 4,383,209
[45] May 10, 1983

[54] CONTROL SYSTEM FOR TRANSDUCER POSITIONING MOTOR

[75] Inventor: Martyn A. Lewis, Pacific Palisades, Calif.

[73] Assignee: Minnesota Mining and Manufacturing Company, Saint Paul, Minn.

[21] Appl. No.: 197,184

[22] Filed: Oct. 15, 1980

[51] Int. Cl.³ ............................ G05B 5/00; G05B 6/00
[52] U.S. Cl. .................................... 318/696; 318/685; 318/561
[58] Field of Search ............... 318/696, 685, 561, 651, 318/594, 592, 590, 599; 360/77-78

[56] References Cited

U.S. PATENT DOCUMENTS

| | | |
|---|---|---|
| 3,706,857 | 12/1972 | Lynott . |
| 3,860,861 | 1/1975 | Gucker ............................. 318/561 |
| 3,974,434 | 8/1976 | Yablonski ......................... 318/696 |
| 3,994,016 | 11/1976 | Moghadam . |
| 4,072,990 | 2/1978 | Case et al. . |
| 4,087,843 | 5/1978 | Louis et al. . |
| 4,092,682 | 5/1978 | Andrews, Jr. et al. . |
| 4,096,533 | 6/1978 | Jenkins . |
| 4,096,534 | 6/1978 | Brownback et al. . |
| 4,101,942 | 7/1978 | Jacques . |
| 4,115,823 | 9/1978 | Commander et al. . |
| 4,122,503 | 10/1978 | Allan . |
| 4,125,882 | 11/1978 | Erickson, Sr. et al. . |
| 4,130,844 | 12/1978 | Klinger . |
| 4,135,217 | 1/1979 | Jacques et al. . |
| 4,277,732 | 6/1981 | Hittel et al. ...................... 318/685 |

FOREIGN PATENT DOCUMENTS

| | | |
|---|---|---|
| 142777 | 7/1972 | Fed. Rep. of Germany . |
| 1405028 | 11/1973 | United Kingdom . |
| 2023893 | 2/1979 | United Kingdom . |

OTHER PUBLICATIONS

Machine Design, vol. 49, No. 25, 1977, "Current Sensors Close the Loop in Stepper Controls," pp. 147 to 148.

IBM Technical Disclosure Bulletin, vol. 24, Nr. 1B, Jun. 1981, P. A. Cook et al., "Step Motor Chopper Driver", pp. 574 to 575.

Primary Examiner—J. V. Truhe
Assistant Examiner—A. Evans
Attorney, Agent, or Firm—Cruzan Alexander; Donald M. Sell; William D. Bauer

[57] ABSTRACT

A control system for a stepper motor utilized in positioning a transducer in relationship to a plurality of parallel tracks on a record media. Dual closed loop feedback systems are provided. A current control circuit is provided having a high output impedance and a voltage control circuit is provided having a low output impedance. A switch may select the control sensor when the transducer is making coarse adjustments in position and may select the voltage control sensor when the transducer is making fine adjustments in position. A seamless switchover may be achieved where the voltage control sensor has a time constant which matches the time constant of the stepper motor. Performance is further improved by providing an impedance cancellation circuit which eliminates the internal resistance of the motor in order to quickly damp motionally induced emf of the motor.

15 Claims, 4 Drawing Figures

CONTROL SYSTEM FOR TRANSDUCER POSITIONING MOTOR

BACKGROUND OF THE INVENTION

The present invention relates generally to open loop control systems for motors, particularly stepper motors, and more particularly to open loop control systems for stepper motors used in disk files and particularly where the stepper motor is utilized to position a transducer with respect to a record media.

Disk files are in wide use for the storage and reproduction of signals on magnetic disk media. Such disk media have multiple parallel circular tracks. A moveable transducer is mounted on a control arm and is capable of servicing a plurality of record tracks. A particular disk file may have a plurality of disk platters with each disk platter having two surfaces, both of which may be utilized. A particular disk file may even have multiple transducers per disk platter surface. The transducer movement with respect to the parallel circular tracks on a particular disk platter surface may be controlled by the use of a stepper motor. Upon command from a control unit, the stepper motor will move the transducer from one selected record track to another selected record track. This movement, consisting of acceleration and deceleration, is controlled by a system controller which knows which record track it is servicing and to which selected record track it is to be moved.

How fast a stepper motor, and hence a transducer, reacts to a request to change record tracks, "seek" mode, and how accurate a stepper motor holds a particular record track, "detent" mode, is extremely important in disk file applications. Accuracy in positioning is directly related to the track density which is achievable.

Great measures are taken to increase track density. For example, compensating temperature coefficients of expansion are built into transducer positioning mechanisms. Temperatures are maintained as close to constant as possible by the addition of substantial cooling mechanisms, and by the achievement of constant power dissipation even in different modes of operation. Such a constant power dissipation will produce a constant amount of heat generated from that power dissipation and will result in a more nearly stable temperature given a stable environment.

In control systems for a stepper motor, power to the stepper motor may come from a programmed current high impedance source (sometimes called a "constant current" source), from a programmed voltage low impedance source (sometimes called a "constant voltage" source), or from a source with intermediate impedance characteristics. The programmed current source and the intermediate impedance source may be achieved in a variety of ways and are well known in the art. The programmed voltage source is not commonly used. One text which is especially helpful in explaining such drive systems is entitled *Incremental Motion Control—Step Motors and Control Systems*, edited by Benjamin C. Kuo, copyright 1979, published by S.R.L. Publishing Company, P. O. Box 2277, Station A, Champaigne, Illinois 61820, which is hereby incorporated by reference. Of particular interest in this text is Chapter 4 relating to drive circuitry for stepper motors.

Stepper motor control systems utilizing a programmed current source are advantageous because the rate at which the stepper motor current can be changed is very fast. This means that the rate at which the sequence of current values through which a stepper motor must be sequenced, during seek mode, can be made quite rapid. The rate is limited mainly by the voltage at which the programmed current source saturates since it is this voltage which sets the rate of charge and discharge of the stepper motor winding inductance.

However, during seek mode, while a transducer is moving to a new target record track, and as that transducer is reaching the target record track, a stepper motor positioning the transducer will tend to oscillate. This oscillation manifests itself in an oscillation of the motionally induced (back) emf of the motor phase windings. This oscillation and the need to damp these oscillations is recognized in the Kuo text, especially in Chapter 8 entitled "Damping of Step Motors."

If at its final position the stepper motor is controlled by a programmed current control source, a substantial time is required to damp these oscillations because no electronic damping is available. In one exemplary system, the time to damp this oscillation has been shown to be approximately 30 cycles of the basic motor/load resonant frequency.

Some open loop control systems utilized for stepper motors used for positioning transducers use techniques to damp these inherent oscillations of the stepper motor. Techniques commonly used to damp stepper motors which are well known in the art are enumerated in Chapter 8 of Kuo's book. The mechanical dampers have the advantage of being insensitive to the phase of the oscillations occurring as the stepper motor reaches its last step, target record track, but suffer the disadvantage of high inertia, high cost, large size and poor reliability. The open loop electronic dampers suffer from the disadvantage of requiring timing which must be related to the phase of the oscillations occurring as the stepper motor reaches its last step. In fact, in random access positioning systems, considerable oscillations are present as the stepper reaches its last step. Furthermore, the phase of these oscillations depend on the number of steps, the prior speed profile, humidity and other factors making successful timing of the electronic dampers very difficult to achieve.

SUMMARY OF THE INVENTION

The present invention concerns apparatus for positioning a transducer in relationship to a plurality of parallel tracks where the transducer is moveable between successive ones of the parallel tracks and where the position of the transducer is controlled by a motor. In a preferred embodiment, the motor is a stepper motor.

More particularly the invention concerns a control system for the motor, preferably a stepper motor. A current control system is utilized having a high output impedance for controlling the motor by supplying to the motor a programmable current relatively independent of instantaneous inductively and motionally induced emf (back emf) in the motor. A voltage control system is also utilized having a low output impedance for controlling the motor by supplying a programmable voltage relatively independent of instantaneous current in the motor. A switching system is also utilized for selecting the current control system when the transducer is making coarse adjustments in position relative to a selected one of the parallel tracks, and for selecting the voltage control system when the transducer is making fine adjustments in position relative to the selected one of the parallel tracks.

In a stepper motor control system using a programmed voltage source, the source presents a substantially zero impedance to the stepper motor, thereby allowing the motor to act as a generator with its own internal impedance as a load. The power developed by the generator causes the oscillations of the stepper motor to damp rapidly and independently of the phase of the oscillations at the last step. In one exemplary system, this dampening has occurred in approximately five to ten cycles. However, the programmed voltage source is inadequate to increment the stepper motor at high speeds because the rate of charge of current in the stepper motor is not fast. Thus both the current control system and the voltage control system are utilized. Both control modes (current and voltage) use a pulse width modulated power driver to increase efficiency and to minimize the total power variations as the motor operates in seek mode. The relatively small power variations minimize the variations in temperature occurring in the disk drive thereby improving the positioning accuracy of the transducer.

Further, the system is particularly useful where there is seamless switchover between the current control system and the voltage control system. This is achieved where the voltage control system has a characteristic time constant consisting substantially of a resistance $R_v$ times a capacitance C, where the motor has a characteristic time constant consisting substantially of an inductance L divided by a resistance $R_m$, and where the value of $R_vC$ is substantially equal to the value of $L/R_m$ thereby achieving the seamless switchover.

With the switch to a voltage control system, when the stepper motor is making fine adjustments in the position of the transducer with respect to the selected record track, the voltage control system looks to the stepper motor as an approximate zero impedance. The limitation then on time to dissipate the back emf induced in the phase windings of the stepper motor is the internal resistance of the stepper motor itself, generally comprising the resistance of the stator windings. Since the magnitude of this internal stalled impedance of the stepper motor is known and remains relatively constant, an impedance canceling system also may be coupled into the voltage control system feedback loop to provide a driving impedance to the stepper motor of a magnitude which is exactly equal to and has a phase which is exactly opposite to the magnitude and phase of the internal stalled impedance of the phase windings of the stepper motor itself. This results in an effective resistance to the back emf created in the stepper motor of zero ohms since the artificial negative impedance added and the internal stalled impedance of the stepper motor effectively cancel. With the addition of this impedance canceling system, the damping time for the back emf created the stepper motor windings is made even shorter. An exemplary system damps the oscillations within three to four cycles, independent of the phase of the oscillations at the last step.

As the amount of time needed to damp the stepper motor as the transducer is reaching its target record track is made reduced, the response time of a disk file utilizing the transducer is made faster. The response time of the disk file is shortened as the time in which a predetermined degree of positioning accuracy in the transducer with respect to the target record track is achieved is made shorter.

BRIEF DESCRIPTION OF THE DRAWINGS

The foregoing advantages, construction and operation of the present invention will become more readily apparent from the following description and accompanying drawings in which.

DESCRIPTION OF THE PREFERRED EMBODIMENTS

Figure 1:
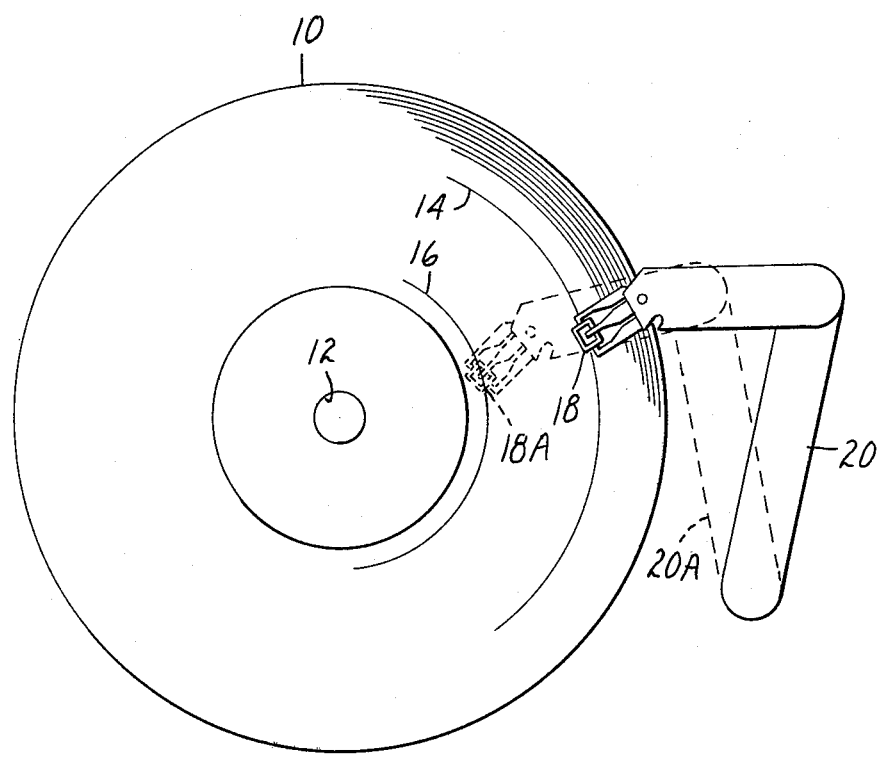
FIG. 1 is a representation of a transducer positioning mechanism for a disk file to which the control system of the present invention may be applied.

FIG. 1 illustrates a magnetic disk platter 10 being rotated around a spindle 12 and having a plurality of circular parallel record tracks. Two exemplary record tracks (14 and 16) are shown in FIG. 1 for descriptive purposes. A transducer 18 is shown positioned properly with respect to track 14 and is mounted on a transducer positioning mechanism 20. The transducer positioning mechanism 20 is driven by a stepper motor (not shown). As commands are received by the stepper motor from the system controller (not shown), the stepper motor is sequenced so that the transducer 18 is accelerated inward from track 14 and then decelerated to the dotted 18A position at track 16 supported by transducer positioning mechanism 20A. Track 16 in this example, would be the target track. The transducer 18 would be moving in seek mode from its position represented by reference numeral 18 on track 14 to a position near that position represented by reference numeral 18A aligned with track 16. As the transducer 18 is damped and holds track 16, detent mode is achieved. When the transducer 18 is seeking and accelerating from track 14 toward track 16 it is making a coarse position adjustment. As transducer 18 approaches track 16 and decelerates and is damped to be positioned on track 16, it is making fine adjustments in position.

Figure 2:
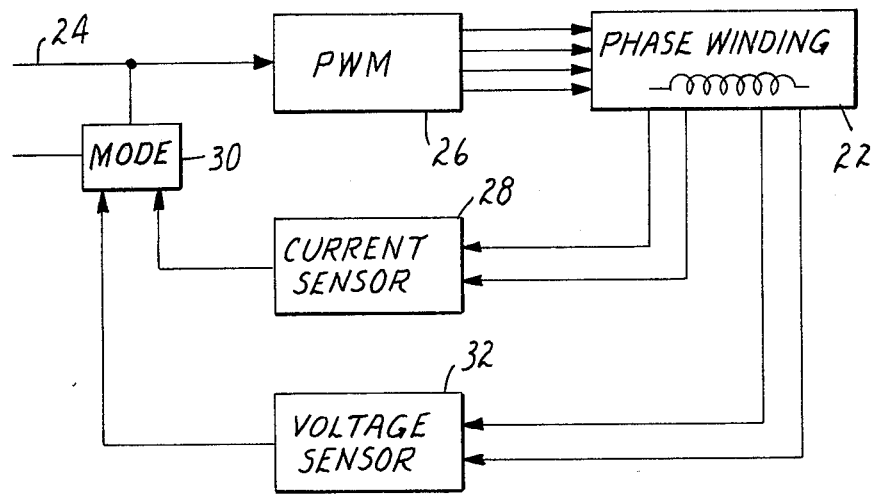
FIG. 2 is a block diagram of the control system of the present invention.

FIG. 2 represents a block diagram of the dual mode control for the phase windings of the stepper motor. Only one phase winding 22 is illustrated in FIG. 1. While it is anticipated that a given stepper motor will have a plurality of windings, and in a preferred embodiment it has two phase windings, the control system for each phase winding is identical. Therefore, the control system for controlling one phase winding 22 will be described in detail with the understanding that it is equally applicable to all other phase windings. A programmed current signal on line 24 is supplied from an external source (a system controller, not shown) to represent the particular current program to be supplied to this particular phase winding 22 in order to move the stepper motor or to sequence the stepper motor the proper step or number of steps to reach the selected target track. This signal is supplied to a pulse width modulation circuit 26 which in turn supplies the current program to the phase winding 22. A closed loop feedback system in the prior art may include either a current sensor or a voltage sensor coupled from the phase winding 22 back to input line 24 providing an input to the pulse width modulation circuit 26. However, note that in the system of the present invention, dual sensors are provided. A current sensor 28 is provided to sense the current present in phase winding 22 and to feedback that indication through mode switch 30 to input 24 to pulse width modulation circuit 26. The system in FIG. 2 also includes a voltage sensor 32 coupled across phase winding 22 to supply feedback from phase winding 22 to the pulse width modulation circuit 26. Mode switch 30 may then select from either the current sensor 28 or the voltage sensor 32 to supply either constant current feedback or constant voltage feedback respectively.

It is to be understood that the particular current supplied on input line 24 and the mode of feedback control is under the control of a system controller (not shown) which is outside the scope of the present invention. The system controller knows where the stepper motor is located and through what steps the stepper motor needs to sequence in order for the transducer to reach the selected target track and it knows when the stepper motor is making coarse adjustments in position and when it is making fine adjustments in position. It is within the scope of the present invention to provide the capability to the system controller for having both modes of operation and the ability to switch between them.

Figure 3A:
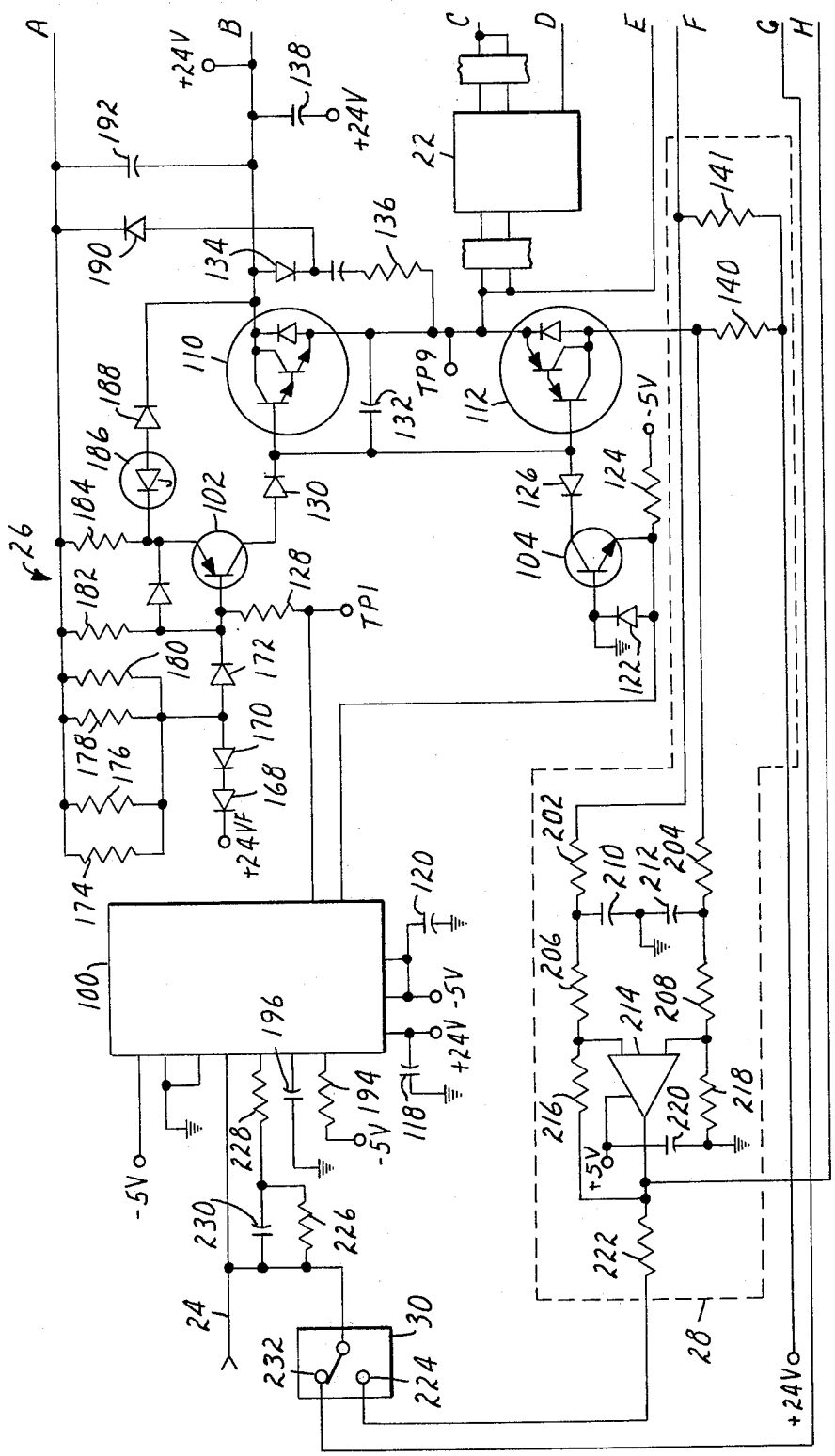
FIGS. 3a and 3b are a schematic diagram of the control system of FIG. 2.
Figure 3B:
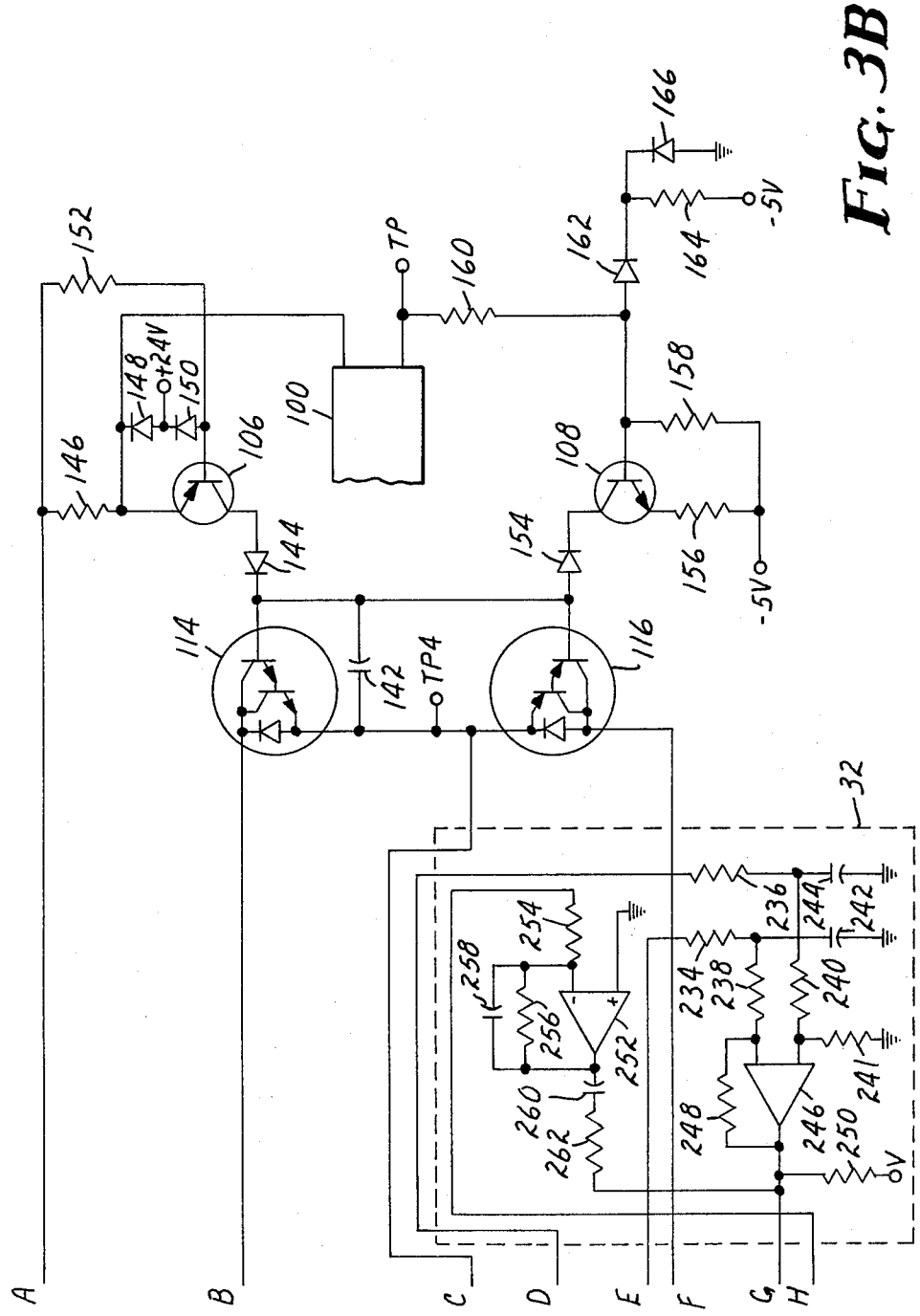

The dual control systems of the present invention may be more readily understood by reference to FIGS. 3a and 3b which provide a schematic diagram of the feedback control loop. These figures illustrate the phase winding 22 shown at the center right of FIG. 3a, the current sensor 28 shown in the dashed box in the lower left of FIG. 3a, the voltage sensor shown in the dashed box at the lower left of FIG. 3b and the mode switch shown at center left of FIG. 3a. All of the remaining circuitry in both FIGS. 3a and 3b represent the pulse width modulation circuit 26. The pulse width modulation circuit shown is exemplary of those well known in the art.

Current program input signal 24 is supplied to the input of the pulse width modulated loop control circuit 100. Note that a portion of circuit 100 is shown center right of FIG. 3b. Control circuit 100 operates through transistors 102, 104, 106, 108 and switching transistors 110, 112, 114, 116, to provide pulse width modulation switching to the phase winding 22 of the stepper motor. Miscellaneous components 118 through 138 and 142 through 196 complete the circuit of this well-known pulse width modulation control circuit.

Current sensor 28 in FIG. 3a operates as a difference amplifier by taking the difference in the current present through the collector of transistor 112 and the collector of transistor 116 with these points measuring the current through the phase winding 22. The difference between the currents present in the collector of transistor 112 and the collector of transistor 116 quite accurately represents the current in the motor. The signals are then supplied through resistors 202, 204, 206 and 208 and capacitors 210 and 212 to operational amplifier 214 operating as a difference amplifier with resistors 216, 218 and capacitor 220. The output of the current sensor is then supplied through feedthrough resistor 222 to input 224 of mode switch 30. When the system controller selects terminal 224 of mode switch 30, or in other words selects current sensor 28, the resulting signal supplied to pulse width modulation control circuit 100 through line 24, resistors 226, 228 and capacitor 230 represents a signal indicative of the current flowing through the phase winding 22.

When terminal 232 of mode switch 30 is selected, voltage sensor 32 is coupled in the feedback loop to the pulse width modulation control circuit 100. Voltage sensor 32 is coupled directly across phase winding 22 through resistors 234, 236, 238, 240, and 241 and capacitors 242 and 244. Operational amplifier 246 operates as a subtractor in conjunction with resistors 248 and 250. The resulting output of operational amplifier 246 then is a signal directly indicative of the voltage across the phase winding 22. When terminal 232 of the mode switch 30 is selected, the voltage sensor 32 is coupled in the feedback loop. Because of the heavy voltage feedback the output impedance is relatively small. This low output impedance then enables the back emf generated by the oscillations of the stepper motor to be dissipated through a low impedance resulting in a small mechanical time constant due to the low output resistance. This results in a short decay time of the oscillations.

Further improvement in the operation of the feedback loop may be accomplished by the coupling of an impedance cancelling circuit to the outputs of the current sensor 28 and the voltage sensor 32. Specifically, an operational amplifier is coupled to the output of the operational amplifier 214 through resistor 254. The positive input to operational amplifier 252 is coupled to ground. Operational amplifier 252 with resistor 256 and capacitor 258 acts as a phase inverter with a gain of minus one. The output of operational amplifier 252 is coupled through capacitor 260 to block DC and through feedthrough resistor 262 to the output of voltage sensor 32. This network operates as an impedance canceling circuit by providing a positive current feedback via a generalized impedance which blocks direct current but otherwise matches the impedance (both resistance and inductive reactance) of the phase winding 22. The operational amplifier 252 has a gain of minus one. This provides, at a relatively low operating frequency, in a preferred embodiment approximately 200 hertz corresponding to the stepper motor and load resonant frequency, a positive feedback path which in conjunction with the negative voltage feedback creates a driving impedance exactly opposite that of the impedance of the phase winding 22. Thus, when this impedance canceling circuit is coupled in the feedback loop of the pulse width modulation control circuit 100, its impedance matches and cancels the impedance of phase winding 22. Thus, any back emf motionally induced in phase winding 22 may be quickly clamped through an essentially net zero impedance. This is because the impedance canceling circuit effectively compensates for the internal impedance of the phase winding 22 with the result of a net zero impedance. This results in an extremely short mechanical time constant and a very short decay time for such back emf.

The component values and part numbers for components listed in the schematic diagram of FIG. 3a and 3b are listed in Table 1.

TABLE I

| Reference Numeral | Component | Value or Type No. | Manufacturer |
|---|---|---|---|
| 100 | Pulse Width Modulation Control Circuit | TL 495 | Motorola |
| 102 | Transistor | 2907 | Motorola |
| 104 | Transistor | 2222 | Motorola |
| 106 | Transistor | 2907 | Motorola |
| 108 | Transistor | 2222 | Motorola |
| 110 | Transistor | MJE 3300 | Motorola |
| 112 | Transistor | MJE 3310 | Motorola |
| 114 | Transistor | MJE 3300 | Motorola |
| 116 | Transistor | MJE 3310 | Motorola |
| 118 | Capacitor | 0.01 microfarads | — |
| 120 | Capacitor | 0.01 microfarads | — |

TABLE I-continued

| Reference Numeral | Component | Value or Type No. | Manufacturer |
|---|---|---|---|
| 122 | Diode | 1N 914 | — |
| 124 | Resistor | 1 kilohms | — |
| 126 | Diode | 1N 914 | — |
| 128 | Resistor | 2.2 kilohms | — |
| 130 | Diode | 1N 914 | — |
| 132 | Capacitor | 330 microfarads | — |
| 134 | Diode | 1N 4002 | — |
| 136 | Resistor | 10 ohms | — |
| 138 | Capacitor | 1 microfarad | — |
| 140 | Resistor | 0.5 ohm, 1 watt | — |
| 142 | Capacitor | 330 microfarads | — |
| 144 | Diode | 1N 4002 | — |
| 146 | Resistor | 3.9 kilohms | — |
| 148 | Diode | 1N 914 | — |
| 150 | Diode | 1N 914 | — |
| 152 | Resistor | 10 kilohms | — |
| 154 | Diode | 1N 914 | — |
| 156 | Resistor | 1 kilohm | — |
| 158 | Resistor | 4.7 kilohm | — |
| 160 | Resistor | 2.2 kilohms | — |
| 162 | Diode | 1N 914 | — |
| 164 | Resistor | 220 ohms | — |
| 166 | Diode | 1N 914 | — |
| 168 | Diode | 1N 914 | — |
| 170 | Diode | 1N 914 | — |
| 172 | Diode | 1N 914 | — |
| 174 | Resistor | 2.4 kilohms ½ watt | — |
| 176 | Resistor | 2.4 kilohms ½ watt | — |
| 178 | Resistor | 2.4 kilohms ½ watt | — |
| 180 | Resistor | 2.4 kilohms ½ watt | — |
| 182 | Resistor | 10 kilohms | — |
| 184 | Resistor | 3.9 kilohms ¼ watt | — |
| 186 | Light Emitting Diode | 1N 4734 | — |
| 188 | Diode | 1N 914 | — |
| 190 | Diode | 1N 4002 | — |
| 192 | Capacitor | 1.0 microfarads | — |
| 194 | Resistor | 4.7 kilohms | — |
| 196 | Capacitor | 0.01 microfarads | — |
| 198 | | | |
| 200 | | | |
| 202 | Resistor | 1 kilohm | — |
| 204 | Resistor | 1 kilohm | — |
| 206 | Resistor | 51.1 kilohm | — |
| 208 | Resistor | 51.1 kilohm | — |
| 210 | Capacitor | 0.01 microfarads | — |
| 212 | Capacitor | 0.01 microfarads | — |
| 214 | Operational Amplifier | TL082 | Texas Instruments |
| 216 | Resistor | 100 kilohms, 1% | — |
| 218 | Resistor | 100 kilohms, 1% | — |
| 220 | Capacitor | 0.01 microfarads | — |
| 222 | Resistor | 10 kilohms, 1% | — |
| 226 | Resistor | 82.5 kilohms, 1% | — |
| 228 | Resistor | 8.2 kilohms, 1% | — |
| 230 | Capacitor | 0.033 microfarads | — |
| 234 | Resistor | 1 kilohm | — |
| 236 | Resistor | 1 kilohm | — |
| 238 | Resistor | 51 kilohms | — |
| 240 | Resistor | 51 kilohms | — |
| 241 | Resistor | 51 kilohms | — |
| 242 | Capacitor | 1 microfarad | — |
| 244 | Capacitor | 1 microfarad | — |
| 246 | Operational Amplifier | TL082 | Texas Instruments |
| 248 | Resistor | 51 kilohms | — |
| 249 | Resistor | 8.25 kilohms | — |
| 250 | Resistor | 200 kilohms | — |
| 252 | Operational Amplifier | TL082 | Texas Instruments |
| 254 | Resistor | 51.1 kilohms | — |
| 256 | Resistor | 51.1 kilohms | — |
| 258 | Capacitor | 0.001 microfarads | — |
| 260 | Capacitor | 0.075 microfarads | — |
| 262 | Resistor | 5.11 kilohms | — |

Thus, it has been seen that there has been shown and described a novel control system for a stepper motor, especially a stepper motor used in positioning a transducer. It is understood, however, that various changes, modifications and substitutions in the form of the details of the described method can be made by those skilled in the art without departing from the scope of the invention as defined by the following claims.

What is claimed is:

1. In combination with an apparatus for positioning a transducer in relationship to a plurality of parallel tracks on a record media, said transducer being moveable between successive ones of said parallel tracks, where the position of said transducer is controlled by a motor, a control system for said motor comprising:
   current control means having a high output impedance for controlling said motor by supplying to said motor a programmable current relatively independent of instantaneous inductively and motionally induced emf in said motor;
   voltage control means having a low output impedance for controlling said motor by supplying a programmable voltage relatively independent of instantaneous current in said motor; and
   switching means for selecting said current control means when said transducer is making coarse adjustments in position relative to a selected one of said parallel tracks and for selecting said voltage control means when said transducer is making fine adjustments in position relative to said selected one of said parallel tracks.

2. A control system as in claim 1 wherein said motor is a stepper motor.

3. A control system as in claim 2 wherein said voltage control means has a characteristic time constant consisting substantially of a resistance $R_v$ times a capacitance C ($R_vC$), where said motor has a characteristic time constant consisting substantially of an inductance L divided by a resistance $R_m$ ($L/R_m$) and where the value of said $R_vC$ is substantially equal to the value of said $L/R_m$ whereby a seamless switchover between said current control means and said voltage control means is achieved.

4. A control system in combination with a stepper motor having at least one phase winding for controlling the movement of said stepper motor, comprising:
   a current sensor coupled to said phase winding for producing a current feedback signal indicative of the current in said phase winding of said stepper motor;
   a voltage sensor coupled to said phase winding for producing a voltage feedback signal indicative of the voltage across said phase winding of said stepper motor;
   a mode switch receiving said current feedback signal and said voltage feedback signal as inputs, said mode switch selecting between said current feedback signal and said voltage feedback signal; and a pulse width modulation control circuit operatively coupled to said phase winding and receiving as an input the selected one of said current feedback signal and said voltage feedback signal;

whereby said stepper motor may be operated in either current control mode utilizing said current sensor and said current feedback signal or in voltage control mode utilizing said voltage sensor and said voltage feedback signal.

5. A control system as in claim 4 wherein said stepper motor positions a transducer in relationship to a plurality of parallel tracks on a record media and wherein said stepper motor when acquiring a new position based upon a new selected one of said parallel tracks is operated in current control mode when said stepper motor is making coarse adjustments in position relative to said new selected one of said parallel tracks and is operated in voltage control mode when said stepper motor is making fine adjustments in position relative to said new selected one of said parallel tracks.

6. A control system as in claim 5 wherein said motor has a resistance $R_m$, wherein said voltage sensor has a characteristic time constant of a resistance $R_v$ times a capacitance C ($R_vC$) and wherein the value of said time constant $R_vC$ approximates the value of said inductance L divided by the value of said resistance $R_m$.

7. A control system as in claim 6 wherein said characteristic time constant $R_vC$ of said voltage sensor is comprised substantially of an input series resistor having a value of approximately said $R_v$ and an input to ground capacitor having a value of approximately said C.

8. A control system as in claim 5 wherein said voltage sensor comprises:
an operational amplifier having an output and having two inputs, said output being said voltage error signal; and
a first and a second resistor for each of said two inputs coupled in series between each of said two inputs and respective sides of said phase winding; and a capacitor for each of said inputs coupled from the juncture of said first and said resistors to ground.

9. A control system as in claim 5 wherein said current sensor comprises:
an operational amplifier having an output and having two inputs,
a resistor coupled in series between said output of said operational amplifier and said current error signal.

10. A control system in combination with a stepper motor having a plurality of phase windings for controlling the movement of said stepper motor, comprising:
a current sensor for each of said plurality of phase windings coupled to each respective one of said plurality of phase windings for producing current feedback signals for each respective phase winding indicative of the current in each respective one of said phase windings of said stepper motor;
a voltage sensor for each of said plurality of phase windings coupled across each respective one of said plurality of phase windings for producing voltage feedback signals for each respective phase winding indicative of the voltage across each respective one of said phase windings of said stepper motor;
a mode switch receiving said current feedback signals and said voltage feedback signals as inputs and for selecting between respective said current feedback signals and said voltage feedback signals, the selected signals being respective feedback signals; and
a pulse width modulation control circuit for each of said plurality of phase windings operatively coupled to each respective phase winding and coupled to receive said feedback signals as an input signal;
whereby said stepper motor may be operated in either current control mode utilizing said current sensors or in voltage control mode utilizing said voltage sensors.

11. A control system in combination with controlling a stepper motor of the type capable of moving from a first position to a second position and of the type which generates a motionally induced emf and an inductively induced emf while moving from said first position to said second position, comprising:
a current control means having a high output impedance for controlling said stepper motor by supplying to said motor a programmable current relatively independent of said motionally induced emf and said inductively induced emf;
a voltage control means having a low output impedance for controlling said stepper motor by supplying a programmable voltage relatively independent of the instantaneous current in said stepper motor, and
a switching means for selecting said current control means when said stepper motor is making coarse adjustments in position relative to said second position and for selecting said voltage control means when said stepper motor is making fine adjustments in position relative to said second position.
whereby said motionally induced emf of said stepper motor may be dissipated into the low output impedance of said voltage control means and the internal impedance of said stepper motor when it is making fine adjustments in position.

12. A control system as in claim 11 wherein said voltage control means has a characteristic time constant consisting substantially of a resistance $R_v$ times a capacitance C ($R_vC$), where said stepper motor has a characteristic time constant consisting substantially of an inductance L divided by a resistance $R_m$ ($L/R_m$) and where the value of said $R_vC$ is substantially equal to the value of said $L/R_m$ whereby a seamless switchover between said current control means and said voltage control means is achieved.

13. A control system as in claim 12 wherein said characteristic time constant $R_vC$ of said voltage sensor is comprised substantially of an input series resistor, having a value of approximately said $R_v$ and an input to ground capacitor having a value of approximately said C.

14. A control system as in claim 12 wherein said voltage sensor comprises:
an operational amplifier having an output and having two inputs, said output being said voltage error signal; and
a first and a second resistor for each of said two inputs coupled in series between each of said two inputs and respective sides of said phase winding; and a capacitor for each of said inputs coupled from the juncture of said first and said resistors to ground.

15. A control system as in claim 12 wherein said current sensor comprises:
an operational amplifier having an output and having two inputs,
a resistor coupled in series between said output of said operational amplifier and said current error signal.

* * * * *